(12) United States Patent  
Bae et al.

(10) Patent No.: US 7,713,509 B2  
(45) Date of Patent: *May 11, 2010

(54) METHOD OF FORMING NITROGEN-DOPED SINGLE-WALLED CARBON NANOTUBES

(75) Inventors: Eun-Ju Bae, Yongin-si (KR); Yo-Sep Min, Yonin-si (KR); Wan-Jun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 472 days.

This patent is subject to a terminal disclaimer.

(21) Appl. No.: 11/447,948

(22) Filed: Jun. 7, 2006

(65) Prior Publication Data

US 2007/0157348 A1    Jul. 5, 2007

(30) Foreign Application Priority Data

Jan. 5, 2006    (KR) .................... 10-2006-0001394

(51) Int. Cl.
*D01F 9/12*    (2006.01)
(52) U.S. Cl. .............. 423/447.3; 423/447.1; 423/447.2; 977/749; 977/842; 977/843
(58) Field of Classification Search .............. 423/447.1, 423/447.3, 447.2; 977/749, 842, 843
See application file for complete search history.

(56) References Cited

OTHER PUBLICATIONS

Goldberg, et al., Large-scale synthesis and HRTEM analysis of single-walled B- and N-doped carbon nanotube bundles., Carbon 2000; 38: 2017-2027.*

Min, et al., Low-Temperature Growth of Single-Walled Carbon Nanotubes by Water Plasma Chemical Vapor Deposition, J. Am. Chem. Soc. 2005; 127: 12498-12499.*

Glerup, et al., Synthesis of highly nitrogen-doped multi-walled carbon nanotubes, Chem. Commun. 2003: 2542-2543.*

Lee, et al., Growth of Vertically Aligned Nitrogen-Doped Carbon Nanotubes: Control of the Nitrogen Content over the Temperature Range 900-1100 ° C., J. Phys. Chem. B. 2003; 107: 12958-12963.*

Li, et al., Preferential Growth of Semiconducting Single-Walled Carbon Nanotubes by a Plasma Enhanced CVD Method, Nano Letters 2004; 4(2): 317-321.*

Hata, et al., Water-Assisted Highly Efficient Synthesis of Impurity-Free Single-Walled Carbon Nanotubes, Science 2004; 306: 1362-1364.*

Dai, et al., Ultra-high-yield growth of verticle single-walled carbon nanotubes: Hidden roles of hydrogen and oxygen, Proc. Natl. Acad. Sci. U.S.A., 102(45): 16141-16145 (Nov. 8, 2005).*

Dai, et al., *Ultra-high-yield growth of vertical single-walled carbon nanotubes: Hidden roles of hydrogen and oxygen*, Proc Natl Acad Sci U.S.A., 102(45): 16141-16145 (Nov. 8, 2005).

* cited by examiner

*Primary Examiner*—Stanley S. Silverman
*Assistant Examiner*—Daniel C. McCracken
(74) *Attorney, Agent, or Firm*—Harness, Dickey & Pierce, PLC

(57) ABSTRACT

A method of forming nitrogen-doped or other Group V-doped single-walled nanotubes including: forming a catalyst metal layer on a substrate; loading a substrate having the catalyst metal layer into a reaction chamber; forming an $H_2O$ or other plasma atmosphere in a reaction chamber; and forming the nitrogen-doped or other Group V-doped carbon nanotubes on the catalyst metal layer by supplying a carbon or other Group IV precursor and a nitrogen or other Group V precursor into a reaction chamber where a chemical reaction therebetween is generated in the $H_2O$ or other plasma atmosphere.

10 Claims, 5 Drawing Sheets

CH4=60 sccm
NH3=2 sccm

CH4=60 sccm
NH3=4 sccm

METHOD OF FORMING NITROGEN-DOPED SINGLE-WALLED CARBON NANOTUBES

PRIORITY STATEMENT

This application claims priority under 35 U.S.C. §119 to Korean Patent Application No. 10-2006-0001394, filed on Jan. 5, 2006, in the Korean Intellectual Property Office (KIPO), the entire contents of which are incorporated herein by reference.

BACKGROUND

1. Field

Example embodiments of the present invention relate to a method of forming carbon nanotubes, for example, a method of simply and easily forming nitrogen-doped or other Group V-doped, single-walled carbon nanotubes.

2. Description of the Related Art

A carbon nanotube may be a carbon allotrope and may be a material in which one carbon atom may be combined with other carbon atoms in a honeycomb shaped tube. The diameter of the honeycomb shaped tube may only be a few nanometers. Carbon nanotubes may have improved mechanical characteristics, electrical selectivity, field emission characteristics, and/or relatively highly efficient hydrogen storing medium characteristics.

A carbon nanotube may be a rolled graphite sheet forming a tube having a nano-size diameter, and may have a $sp^2$ bonding structure. A carbon nanotube may have electrical conductor characteristics or semiconductor characteristics according to the rolling angle and the shape of the graphite sheet. Carbon nanotubes may be classified into single-walled nanotubes (SWNTs) and multi-walled nanotubes (MWNTs), according to the number of carbon nanotubes that constitute a wall. Also, a bundle form, in which a plurality of SWNTs is gathered, may be known as a rope nanotube.

Carbon nanotubes may be manufactured using a high synthetic technique, for example, a Plasma Enhanced Chemical Vapor Deposition (PECVD) method, a Thermal Chemical Vapor Deposition (TCVD) method, an electrolysis method, or a flame synthetic method.

Due to their improved electrical characteristics, carbon nanotubes may be used for manufacturing semiconductor devices, for example, CMOS devices. In general, a semiconductor manufacturing process and a semiconductor integration process must be performed at a temperature below about 500° C. to reduce product defects. However, when carbon nanotubes are grown at a temperature below about 500° C. using a conventional carbon nanotube synthetic method, defective carbon nanotubes may be grown because many impurities, for example, amorphous carbon, may be generated during the synthetic process. The defective carbon nanotubes may degrade the characteristics and performance of a semiconductor device.

Also, to manufacture a CMOS using a carbon nanotube-based transistor, an n-type and a p-type SWNT must be manufactured. However, a technique that may dope a donor during the SWNT synthetic process has not been developed. In general, an intrinsic SWNT may have a p-type characteristic by surface adsorption of oxygen in the air. Also, a technique that may synthesize the n-type SWNT has not been developed. To solve this problem, a method of manufacturing an n-type transistor by adsorbing an alkali metal, for example, amine or potassium K having an electron-donating group on a surface of the SWNT, may have been attempted. However, the doping material adsorbed on the surface of the SWNT may be unstable, that is, the doped material may break away at any time. Therefore, the doping of a material by adsorption on the surface of the SWNT remains an unreliable device characteristic.

SUMMARY

Example embodiments of the present invention provide a method of forming SWNTs at a lower temperature, by which the SWNTs may be simply and/or easily doped with nitrogen.

Example embodiments of the present invention provide a method of forming SWNTs at a lower temperature, by which the SWNTs may be simply and/or easily doped with a Group V element.

According to an example embodiment of the present invention, there may be a method of forming nitrogen-doped single-walled nanotubes (SWNTs) comprising: forming a catalyst metal layer on a substrate; loading a substrate having the catalyst metal layer into a reaction chamber; forming an $H_2O$ plasma atmosphere in a reaction chamber; and forming nitrogen-doped carbon nanotubes on the catalyst metal layer by supplying a carbon precursor and a nitrogen precursor into a reaction chamber where a chemical reaction therebetween may be generated in the $H_2O$ plasma atmosphere.

An inner side of a reaction chamber may be maintained at a temperature in a range of between about 400° C. and about 600° C. while the nitrogen-doped single-walled nanotubes may be grown.

The carbon precursor and the nitrogen precursor may be controlled to supply in a flow rate of about ⅙M of nitrogen atom per about 1M of carbon atom.

The carbon precursor may be at least one material selected from the group including $C_2H_2$, $CH_4$, $C_2H_4$, $C_2H_6$, CO, $C_2H_5OH$ and/or the like.

The nitrogen precursor may be at least one material selected from the group including $NH_3$, $NH_2NH_2$, $C_5H_5N$, $C_4H_5N$, $CH_3CN$ and/or the like.

The catalyst metal layer may be formed of Ni, Co, Fe and/or the like, or alloys thereof.

The $H_2O$ plasma atmosphere may be formed using a remote PECVD apparatus, and accordingly, the $H_2O$ plasma may be remote $H_2O$ plasma.

RF-power of the $H_2O$ plasma may be controlled at about 80 W or less.

According to an example embodiment of the present invention, nitrogen-doped single-walled nanotubes may be grown at a lower temperature, e.g., in a range of about 400° C. to about 600° C.

According to an example embodiment of the present invention, there may be a method of forming a Group V-doped single-walled nanotubes (SWNTs) comprising: forming a catalyst metal layer on a substrate; loading a substrate having the catalyst metal layer into a reaction chamber; forming a plasma atmosphere in a reaction chamber; and forming the Group V-doped carbon nanotubes on the catalyst metal layer by supplying a Group IV precursor and a Group V precursor into a reaction chamber where a chemical reaction therebetween may be generated in the plasma atmosphere.

BRIEF DESCRIPTION OF THE DRAWINGS

The above and other features and advantages of example embodiments of the present invention will become more apparent by describing in detail example embodiments thereof with reference to the attached drawings in which.

DETAILED DESCRIPTION OF EXAMPLE EMBODIMENTS

Figure 1:
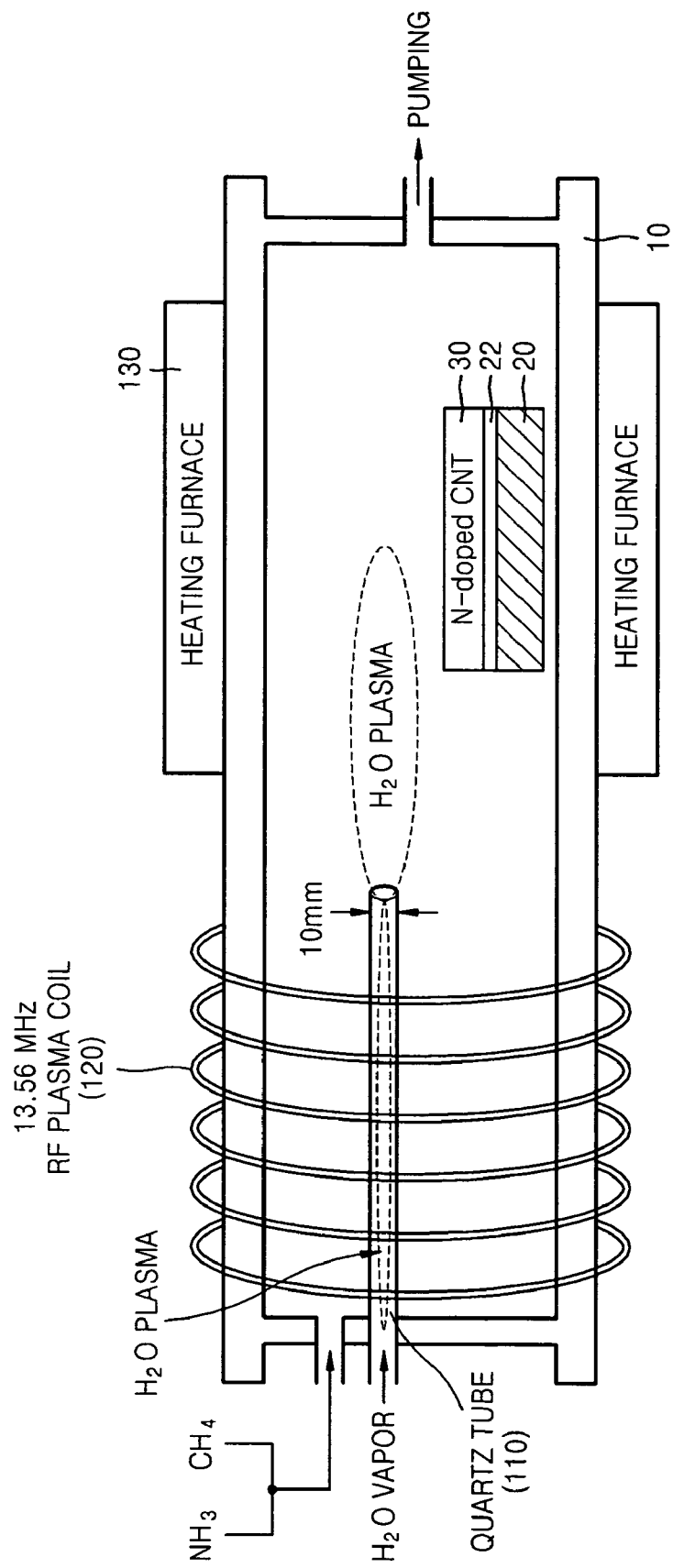
FIG. 1 illustrates a method of forming nitrogen-doped single-walled nanotubes (N-doped SWNTs), according to an example embodiment of the present invention.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90° or at other orientations) and the spatially relative descriptors used herein interpreted accordingly.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a method of forming N-doped single-walled nanotubes (SWNTs), according to an example embodiment of the present invention.

Referring to FIG. 1, a remote plasma enhanced chemical vapor deposition (remote PECVD) apparatus for forming N-doped SWNTs may be depicted. The remote PECVD apparatus includes a reaction chamber 10, a radio frequency (RF) plasma coil 120 to generate plasma in a reaction chamber 10, and a heating furnace 130 that heats an inner surface of a reaction chamber 10 to a desired temperature. In the remote PECVD apparatus, a heating zone and a plasma zone may be separated. In an example embodiment of the present invention, an RF of about 13.56 MHz may be used as a high frequency power source for generating plasma. A quartz tube 110 having a diameter of about 10 mm corresponding to a RF plasma coil 120 may be further mounted in a reaction chamber 10. $H_2O$ vapor may be supplied to a reaction chamber 10 through a quartz tube 110. When a high frequency power is applied to a RF plasma coil 120, $H_2O$ plasma may be generated in a quartz tube 110, and an $H_2O$ plasma atmosphere may be formed in a reaction chamber 10 using the $H_2O$ plasma as a remote plasma source. Hereinafter, a method of forming N-doped SWNTs using the remote PECVD apparatus will now be described.

A substrate 20 may be prepared. A catalyst metal layer 22 may be formed on a substrate 20 and may be formed of Ni, Co, Fe, alloys thereof and/or the like. A substrate 20 may be a glass substrate, a sapphire substrate, a plastic substrate, or a silicon substrate, but a substrate 20, according to an example embodiment of the present invention, need not be limited thereto.

A catalyst metal layer 22 may be formed using one of various thin film deposition methods or one of a plurality of semiconductor coating processes. For example, a catalyst metal layer 22 may be formed on a substrate 20 using a thermal CVD method, a sputtering method, or a spin coating method.

A substrate 20 having a catalyst metal layer 22 may be loaded into a reaction chamber 10. A reaction chamber 10 may be heated by operating a heating furnace 130 and the inside of the reaction chamber 10 may be maintained at a temperature of between about 400° C. and about 600° C. $H_2O$ may be vaporized so as to be supplied to the quartz tube 110, and a $H_2O$ plasma atmosphere may be formed in a reaction chamber 10 by applying RF power to a RF plasma coil 120. A carbon precursor and a nitrogen precursor may be supplied to a reaction chamber 10 and a chemical reaction may occur in the $H_2O$ plasma atmosphere. Thus, N-doped SWNTs may be grown on a catalyst metal layer 22. The carbon precursor may be at least one material selected from the group including $C_2H_2$, $CH_4$, $C_2H_4$, $C_2H_6$, CO, $C_2H_5OH$, and/or the like and the nitrogen precursor is at least one material selected from the group including $NH_3$, $NH_2NH_2$, $C_5H_5N$, $C_4H_5N$, $CH_3CN$ and/or the like. $C_2H_5OH$, $NH_2NH_2$, $C_5H_5N$, $C_4H_5N$, and $CH_3CN$ may be classified as liquids; however, these materials may be supplied to a reaction chamber 10 because they may be more easily vaporized due to their volatility.

According to an example embodiment of the present invention, the nitrogen doping process and the carbon nanotube synthetic process may include a one-step process. The one-step process may be readily applied to manufacture a semiconductor device such as a CMOS because the N-doped SWNTs may be formed directly on a substrate 20. Also, the nitrogen doping may be attained by an atomic substitutional doping mechanism in which the dopant does not break away from the adsorbed surfaces of the SWNTs, thereby increasing device reliability and reproducibility compared to a conventional semiconductor device.

In an example embodiment of the present invention, when the N-doped SWNTs are synthesized in the $H_2O$ plasma atmosphere, the following effects may be obtained. The growth of multi-walled carbon nanotubes (MWNTs) may be reduced, and accordingly, the growth of the N-doped SWNTs may be promoted. Because the N-doped SWNTs may be grown at a relatively low temperature, for example, in a range of about 400° C. to about 600° C., the N-doped SWNTs do not include impurities such as amorphous carbon that may be generated when carbon nanotubes may be grown at a conventional carbon nanotube growing temperature, e.g., 800° C. or more.

While the N-doped SWNTs are grown, the $H_2O$ plasma may act as a mild oxidant or a mild etchant that removes carbonaceous impurities from surfaces of the carbon nanotubes. For this reason, N-doped SWNTs may have fewer carbonaceous impurities and disordered carbon may be obtained. In particular, due to their improved crystallinity because the N-doped SWNTs may be grown at a lower temperature, the N-doped SWNTs may have improved characteristics for forming semiconductor devices.

Also, when the N-doped SWNTs are grown at a lower temperature, the amount of a dopant, e.g., nitrogen, may be more readily controlled. In particular, an excessive amount of nitrogen doping on the N-doped SWNTs may be reduced. An excessive amount of nitrogen doping on the N-doped SWNTs may cause carbon nanotube defects. Therefore, an appropriate amount of nitrogen doping on the N-doped SWNTs may be important. For this reason, the flow rate of the carbon precursor and the nitrogen precursor may be controlled to supply a ratio of equal to or less than 1/8M of nitrogen atom per about 1M of carbon atom to a reaction chamber 10. Also, it has been observed experimentally that when the RF power of $H_2O$ plasma may be controlled at about 80 W or less, improved quality N-doped SWNTs may be obtained.

Figure 2:
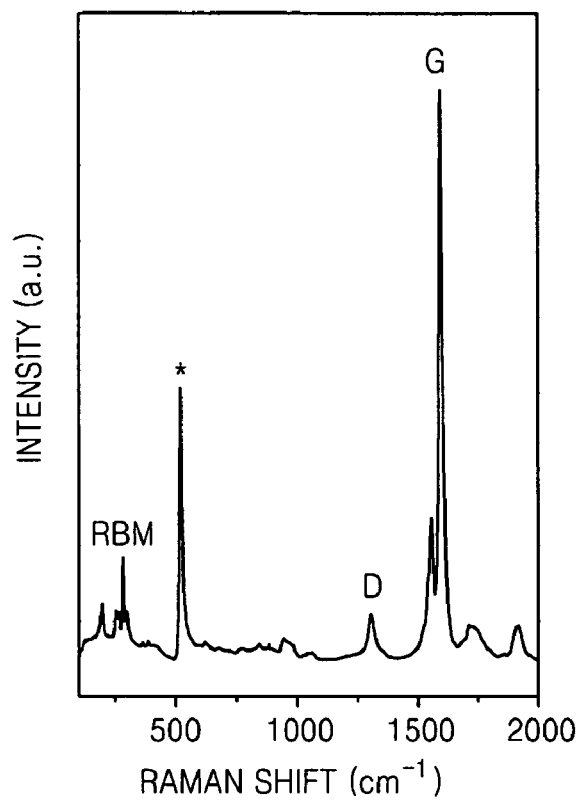
FIG. 2 contains graphs illustrating the results of Raman spectra of N-doped SWNTs formed according to a method of forming N-doped SWNTs according to an example embodiment of the present invention.
Figure 2:
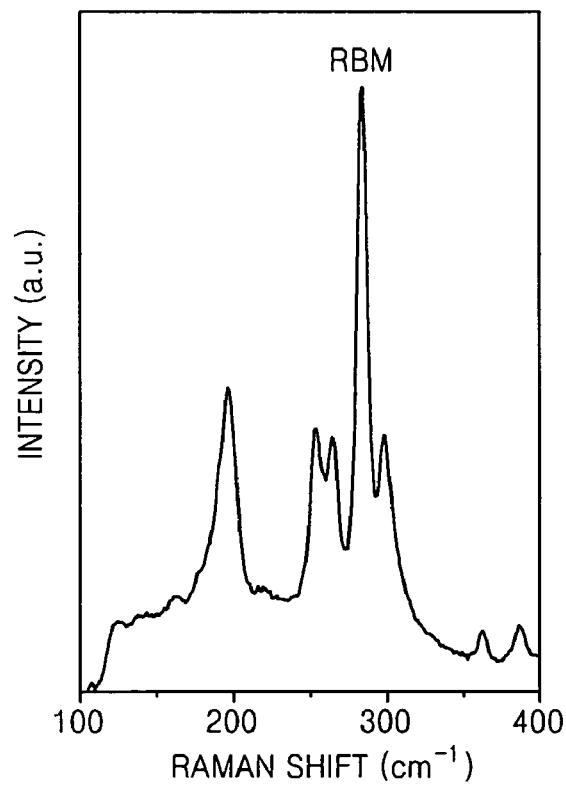

FIG. 2 contains graphs showing the results of Raman spectras of N-doped SWNTs manufactured according to a method of forming N-doped SWNTs according to an example embodiment of the present invention. The N-doped SWNTs were deposited on a substrate under the following process conditions: $CH_4$ flow rate of about 60 sccm; $NH_3$ flow rate of about 6 sccm; a temperature of the inner side of a reaction chamber 10 of about 450° C.; and an RF power of about 15 W. Referring to FIG. 2, according to the Raman analysis, an RBM peak may be clearly shown, which indicates the growth of the N-doped SWNTs.

Figure 3:
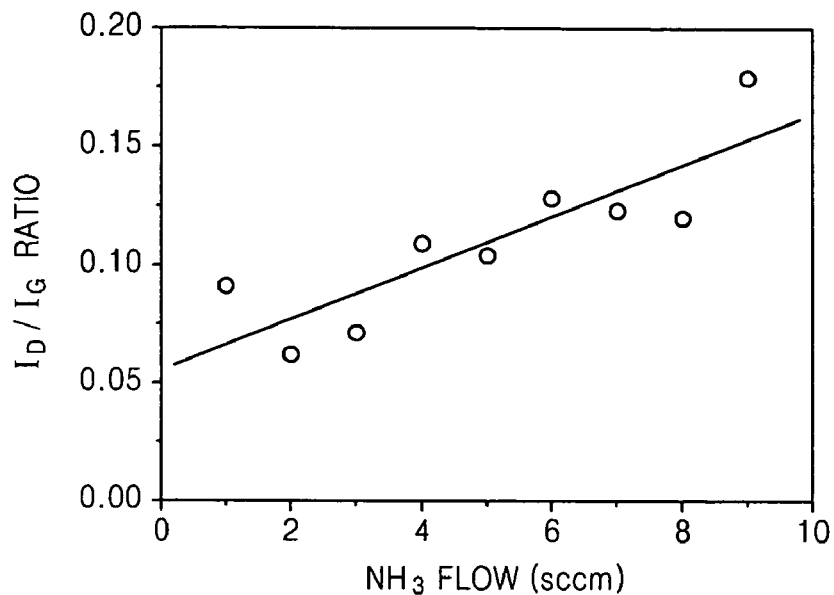
FIG. 3 is a graph illustrating the variation of Raman intensity ratio (ID/IG) between a D-band and a G-band according to $NH_3$ flow rates during the formation of N-doped SWNTs according to an example embodiment of the present invention.

FIG. 3 is a graph showing the variation of Raman intensity ratio (ID/IG) between a D-band and a G-band according to $NH_3$ flow rate during the formation of N-doped SWNTs, according to an example embodiment of the present invention. Referring to FIG. 3, it may be seen that as the $NH_3$ flow rate increases, that is, as the amount of nitrogen doping increases, the ID/IG ratio increases and thus the quality of the N-doped SWNTs may be degraded.

Figure 4:
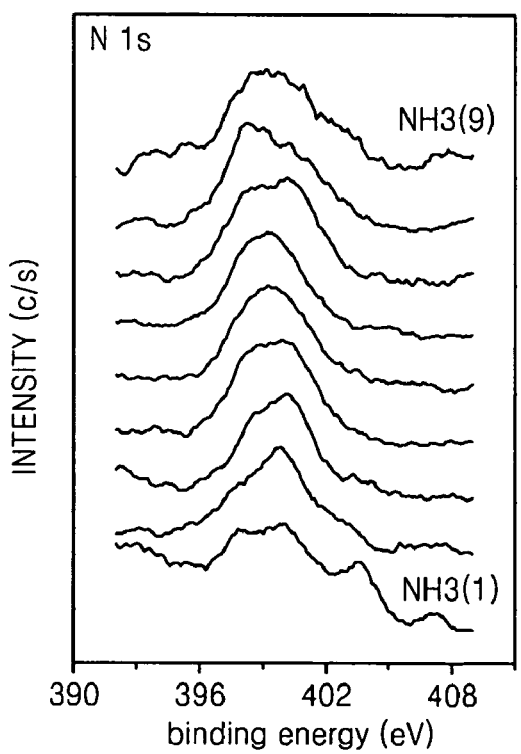
FIG. 4 is a graph illustrating the analysis of X-ray photoelectron spectroscopy (XPS) of N-doped SWNTs formed according to an example embodiment of the present invention.
Figure 5A:
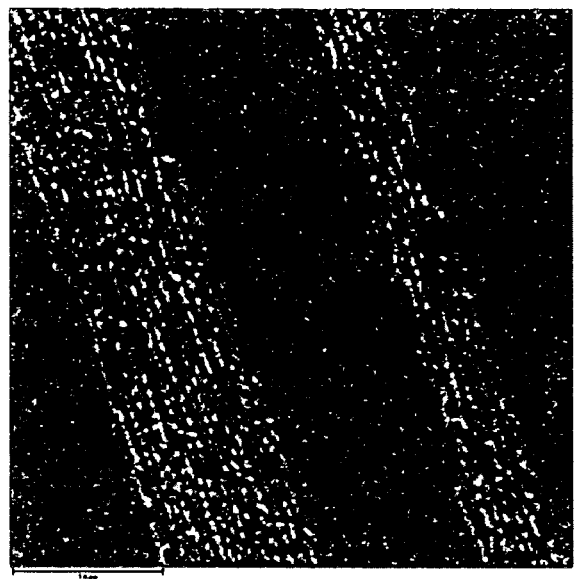
FIGS. 5A through 5D are high-resolution TEM (HR-TEM) images of N-doped SWNTs formed according to an example embodiment of the present invention.
Figure 5B:
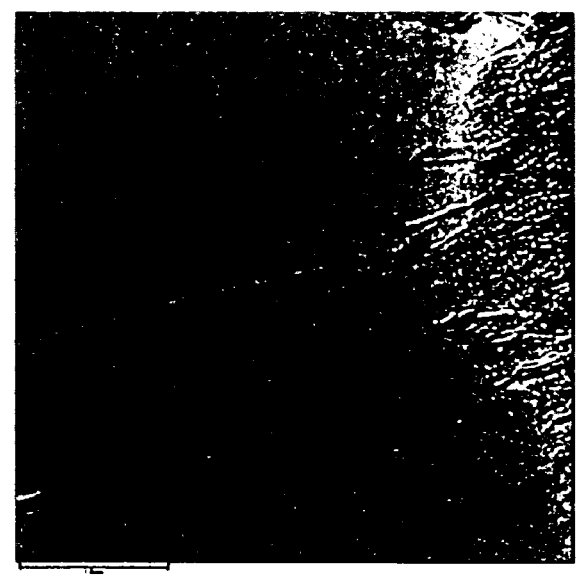
Figure 5C:
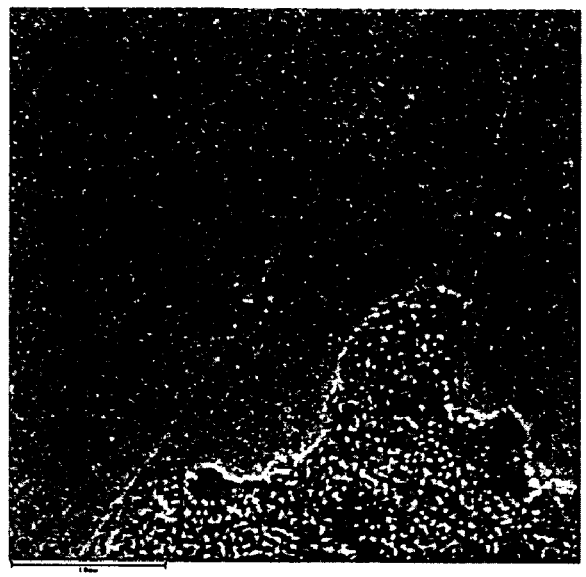
Figure 5D:
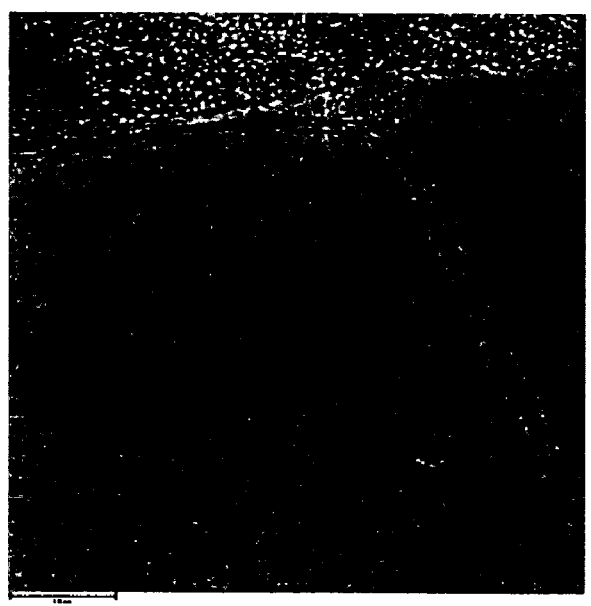

FIG. 4 is a graph showing the analysis of X-ray photoelectron spectroscopy (XPS) of N-doped SWNTs formed according to an example embodiment of the present invention.

FIGS. 5A through 5D are high-resolution TEM (HR-TEM) images of N-doped SWNTs formed according to an example embodiment of the present invention. The TEM images of FIGS. 5A through 5D may be respectively taken when the N-doped SWNTs are formed at flow rates of (a) $CH_4$ about 60 sccm and $NH_3$ about 2 sccm, (b) $CH_4$ about 60 sccm and $NH_3$ about 4 sccm, (c) $CH_4$ about 60 sccm and $NH_3$ about 6 sccm, and (d) $CH_4$ about 60 sccm and $NH_3$ about 8 sccm.

Using the above configuration according to an example embodiment of the present invention, N-doped SWNTs may be formed. In particular, in an example embodiment of the present invention, the nitrogen doping process may be performed simultaneously with the carbon nanotube synthesizing process in a one-step process. That is, an additional process for doping nitrogen may not be required, thereby simply and easily forming the N-doped SWNTs. Also, in an example embodiment of the present invention, the N-doped SWNTs may be directly formed on a substrate. Therefore, the method of forming the N-doped SWNTs may be readily applied to a semiconductor device, for example, a CMOS device. Also, the nitrogen doping may be performed using an atomic substitutional doping mechanism. Therefore, the doping material does not break away from surfaces of the N-doped SWNTs, unlike when the nitrogen doping is obtained by surface adsorption, thereby improving device reliability and/or reproducibility.

According to example embodiments of the present invention, N-doped SWNTs may be synthesized at a relatively low temperature, e.g., in a range of about 400° C. to about 600° C., in a remote $H_2O$ plasma atmosphere, thereby forming improved quality N-doped SWNTs. The N-doped SWNTs obtained in this manner may include fewer carbonaceous impurities and may have a relatively high crystalline structure, thereby having improved characteristics for semiconductor devices.

Although example embodiments of the present invention described above form nitrogen-doped single-walled nanotubes (SWNTs) using a carbon precursor and a nitrogen precursor in the $H_2O$ plasma atmosphere, the present invention is not limited to such a configuration. For example, any Group V-doped single-walled nanotube (SWNT) may be formed using any Group IV precursor and the Group V precursor in any type of plasma atmosphere.

The foregoing is illustrative of example embodiments of the present invention and is not to be construed as limiting thereof. While example embodiments of the present invention have been particularly shown and described with reference to the example embodiments shown in the drawings, it will be understood by those of ordinary skill in the art that various changes in form and details may be made therein without departing from the spirit and scope of example embodiments of the present invention as defined by the following claims.

What is claimed is:

1. A method of forming nitrogen-doped single-walled nanotubes (SWNTs) comprising:
    forming a catalyst metal layer on a substrate;
    loading the substrate having the catalyst metal layer into a reaction chamber;
    forming an $H_2O$ plasma atmosphere in the reaction chamber;
    forming the nitrogen-doped carbon nanotubes on the catalyst metal layer by supplying a carbon precursor and a nitrogen precursor into the reaction chamber where a chemical reaction therebetween is generated in the $H_2O$ plasma atmosphere, and controlling the carbon precursor and the nitrogen precursor to supply at a flow rate of equal to or less than 1/6M of nitrogen atom per about 1M of carbon atom, wherein an inner side of the reaction chamber is maintained at a temperature in a range of between about 400° C. and about 600° C. while the nitrogen-doped single-walled nanotubes are formed.

2. The method of claim 1, wherein the catalyst metal layer is formed using a thin film deposition method or a semiconductor coating process.

3. The method of claim 2, wherein the thin film deposition method or the semiconductor coating process is one of a thermal CVD method, a sputtering method, or a spin coating method.

4. The method of claim 1, wherein the reaction chamber is heated by operating a heating furnace.

5. The method of claim 1, wherein the carbon precursor is at least one material selected from the group including $C_2H_2$, $CH_4$, $C_2H_4$, $C_2H_6$, CO, and $C_2H_5OH$.

6. The method of claim 1, wherein the nitrogen precursor is at least one material selected from the group including $NH_3$, $NH_2NH_2$, $C_5H_5N$, $C_4H_5N$, and $CH_3CN$.

7. The method of claim 1, wherein an RF-power of the $H_2O$ plasma is controlled at about 80 W or less.

8. The method of claim 1, wherein the $H_2O$ plasma atmosphere is formed using a remote PECVD apparatus.

9. The method of claim 1, wherein the $H_2O$ plasma is remote $H_2O$ plasma.

10. The method of claim 1, wherein the catalyst metal layer is formed of Ni, Co, Fe, or alloys thereof.

* * * * *